(12) United States Patent
Shiraishi et al.

(10) Patent No.: US 11,900,656 B2
(45) Date of Patent: Feb. 13, 2024

(54) PROCESSING APPARATUS, AND PROCESSING METHOD

(71) Applicant: NEC Corporation, Tokyo (JP)

(72) Inventors: Soma Shiraishi, Tokyo (JP); Kota Iwamoto, Tokyo (JP); Shinya Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 192 days.

(21) Appl. No.: 17/430,080

(22) PCT Filed: Feb. 15, 2019

(86) PCT No.: PCT/JP2019/005581
§ 371 (c)(1),
(2) Date: Aug. 11, 2021

(87) PCT Pub. No.: WO2020/166068
PCT Pub. Date: Aug. 20, 2020

(65) Prior Publication Data
US 2022/0139068 A1    May 5, 2022

(51) Int. Cl.
*G06K 9/00* (2022.01)
*G06V 10/74* (2022.01)
*G06V 20/68* (2022.01)

(52) U.S. Cl.
CPC ............ *G06V 10/761* (2022.01); *G06V 20/68* (2022.01)

(58) Field of Classification Search
None
See application file for complete search history.

(56) References Cited

U.S. PATENT DOCUMENTS

| 10,970,654 B2* | 4/2021 | Jenkins ................. G06Q 50/28 |
| 2013/0182106 A1 | 7/2013 | Nakamichi et al. |
| 2020/0082169 A1* | 3/2020 | Lu ...................... G08B 21/0476 |

FOREIGN PATENT DOCUMENTS

| JP | 2013-145441 A | 7/2013 |
| JP | 2017-220206 A | 12/2017 |
| JP | 2018-132869 A | 8/2018 |

OTHER PUBLICATIONS

International Search Report for PCT Application No. PCT/JP2019/005581, dated May 7, 21019.

* cited by examiner

*Primary Examiner* — Soo Jin Park

(57) ABSTRACT

This invention provides a processing apparatus (10) including a container identification score computation unit (11) that computes an identification score of a container for a product, based on an image to be processed containing the product, a product identification score computation unit (12) that computes an identification score of the product, based on the image to be processed, and a first identification unit (13) that decides identification information of the product, based on the computed identification score of the container and the computed identification score of the product.

3 Claims, 16 Drawing Sheets

FIG. 3

CONTAINER INFORMATION

| IDENTIFICATION INFORMATION OF PRODUCT | IDENTIFICATION INFORMATION OF CONTAINER |
|---|---|
| LARGE SERVING OF RICE | CONTAINER B |
| MEDIUM SERVING OF RICE | CONTAINER A |
| CONSOMME SOUP | CONTAINER B |
| ⋮ | ⋮ |

MEDIUM SERVING OF RICE

LARGE SERVING OF RICE

| ESTIMATION RESULT OF CONTAINER | CONTAINER A 98%<br>CONTAINER E 32%<br>. . . | CONTAINER B 97%<br>CONTAINER C 28%<br>. . . |
| --- | --- | --- |
| ESTIMATION RESULT OF PRODUCT | LARGE SERVING OF RICE 92%<br>MEDIUM SERVING OF RICE 90%<br>. . . | LARGE SERVING OF RICE 93%<br>MEDIUM SERVING OF RICE 91%<br>. . . |
| IDENTIFICATION RESULT | MEDIUM SERVING OF RICE | LARGE SERVING OF RICE |

FIG. 10

PRODUCT FEATURE INFORMATION

| IDENTIFICATION INFORMATION OF PRODUCT | SHAPE |
|---|---|
| KING OF BLACK TEA (TEA BAG) | QUADRANGLE |
| KING OF BLACK TEA (POWDER) | CIRCLE |
| PIZZANO | CIRCLE |
| ⋮ | ⋮ |

KING OF BLACK TEA (TEA BAG)

KING OF BLACK TEA (POWDER)

| DETERMINATION RESULT OF SHAPE | QUADRANGLE | CIRCLE |
|---|---|---|
| ESTIMATION RESULT OF PRODUCT | KING OF BLACK TEA (TEA BAG) 91%<br>KING OF BLACK TEA (POWDER) 88%<br>. . . | KING OF BLACK TEA (POWDER) 90%<br>KING OF BLACK TEA (TEA BAG) 87%<br>. . . |
| IDENTIFICATION RESULT | KING OF BLACK TEA (TEA BAG) | KING OF BLACK TEA (POWDER) |

PROCESSING APPARATUS, AND PROCESSING METHOD

This application is a National Stage Entry of PCT/JP2019/005581 filed on Feb. 15, 2019, the contents of all of which are incorporated herein by reference, in their entirety.

TECHNICAL FIELD

The present invention relates to a processing apparatus, a processing method, and a program.

BACKGROUND ART

Patent Document 1 discloses a technique for identifying a product by an image analysis, and registering an identified product as a target to be accounted.

CITATION LIST

Related Document

[Patent Document 1] Japanese Patent Application Publication No. 2013-145441

DISCLOSURE OF THE INVENTION

Technical Problem

It is difficult to accurately identify a group of products similar in appearance to each other by an image analysis. The present invention aims to accurately identify a group of products similar in appearance to each other by an image analysis.

Solution to Problem

According to the present invention, a processing apparatus including:
  a container identification score computation means for computing an identification score of a container for a product, based on an image to be processed containing the product;
  a product identification score computation means for computing an identification score of the product, based on the image to be processed; and
  a first identification means for deciding identification information of the product, based on the computed identification score of the container and the computed identification score of the product is provided.

According to the present invention, a processing method executed by a computer including:
  a container identification score computation step of computing an identification score of a container for a product, based on an image to be processed containing the product;
  a product identification score computation step of computing an identification score of the product, based on the image to be processed; and
  a first identification step of deciding identification information of the product, based on the computed identification score of the container and the computed identification score of the product is provided.

According to the present invention, a program for functioning as:
  a container identification score computation means for computing an identification score of a container for a product, based on an image to be processed containing the product;
  a product identification score computation means for computing an identification score of the product, based on the image to be processed; and
  a first identification means for deciding identification information of the product, based on the computed identification score of the container and the computed identification score of the product is provided.

According to the present invention, a processing apparatus including:
  a determination means for determining an appearance feature including at least one of a shape, a color, and a size of a product, based on an image to be processed containing the product;
  a product estimation means for estimating identification information of the product, based on the image to be processed; and
  a second identification means for deciding identification information of the product, based on the determined appearance feature and the estimated identification information of the product is provided.

According to the present invention, a processing method executed by a computer including:
  a determination step of determining an appearance feature including at least one of a shape, a color, and a size of a product, based on an image to be processed containing the product;
  a product estimation step of estimating identification information of the product, based on the image to be processed; and
  a second identification step of deciding identification information of the product, based on the determined appearance feature and the estimated identification information of the product is provided.

According to the present invention, a program for causing a computer to function as:
  a determination means for determining an appearance feature including at least one of a shape, a color, and a size of a product, based on an image to be processed containing the product;
  a product estimation means for estimating identification information of the product, based on the image to be processed; and
  a second identification means for deciding identification information of the product, based on the determined appearance feature and the estimated identification information of the product is provided.

Advantageous Effects of Invention

The present invention can accurately identify a group of products similar in appearance to each other by an image analysis.

BRIEF DESCRIPTION OF THE DRAWINGS

The above and other objects, features, and advantages will be more apparent from the following description of preferred embodiments taken in conjunction with the following accompanying drawings.

FIG. 3 is a table schematically illustrating exemplary information processed by the processing apparatus according to this example embodiment.

FIG. 10 is a table schematically illustrating exemplary information processed by the processing apparatus according to this example embodiment.

DESCRIPTION OF EMBODIMENTS

First Example Embodiment

Figure 1:
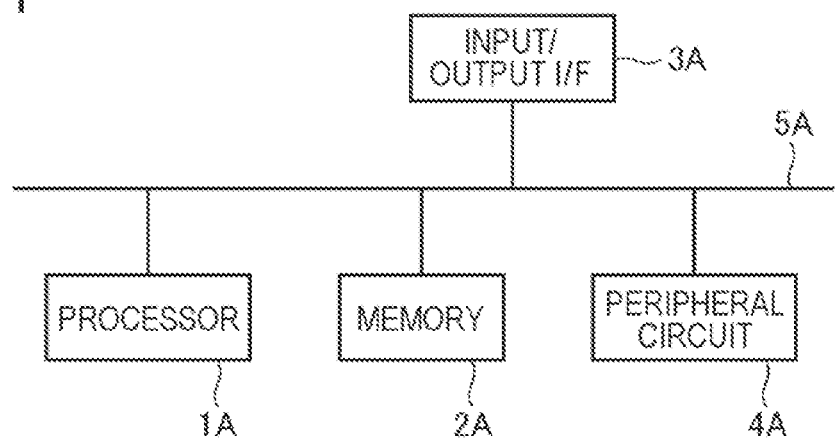
FIG. 1 is a block diagram illustrating an exemplary hardware configuration of a processing apparatus according to this example embodiment.

A premise of this example embodiment will be described first. A target to be identified according to this example embodiment is an product having a object contained in a container. The object contained in the container may be food or drink, or as other objects. Examples of the container include a dish or a plate and a tray, but the present invention is not limited to these examples. Objects of a plurality of products included in a group of products similar in appearance to each other are contained in containers different from each other. The containers different from each other differ in feature of the appearance such as color, shape, size, and pattern from each other.

Note that the respective containers for all the products may be different from each other. In this case, when the number of types of products is defined as M, the number of types of containers is equal to M.

One container may be used in common among a plurality of products. Note that containers different from each other are used as containers for products included in a group of products similar in appearance to each other, and one container is used in common among a plurality of products that are not included in the same group of products as described above.

An overview of a processing apparatus according to this example embodiment will be described subsequently. The processing apparatus is used in a store or a shop such as a convenience store, a supermarket, or a restaurant. The processing apparatus computes an identification score of a first container, based on an image to be processed containing a first product having a first object contained in the first container. Examples of the identification score of the first container include a "value representing the degree of similarity between the first container and each of a plurality of containers registered in advance," a "value representing the certainty factor that the first container is identical to each of a plurality of containers registered in advance," and a "value representing the confidence coefficient that the first container is identical to each of a plurality of containers registered in advance." The processing apparatus computes the identification score of the first container, based on a feature of the appearance of the first container contained in the image to be processed.

The processing apparatus further computes an identification score of the first product, based on the above-mentioned image to be processed. Examples of the identification score of the first product include a "value representing the degree of similarity between the first product and each of a plurality of products registered in advance," a "value representing the certainty factor that the first product is identical to each of a plurality of products registered in advance," and a "value representing the confidence coefficient that the first product is identical to each of a plurality of products registered in advance." The processing apparatus computes the identification score of the first container, based on a feature of the appearance of the first product contained in the image to be processed.

The processing apparatus decides identification information of the first product, based on the computed identification score of the container and the computed identification score of the product.

The configuration of the processing apparatus will be described in detail below. An exemplary hardware configuration of the processing apparatus will be set forth first. Each functional unit of the processing apparatus according to this example embodiment is implemented as any combination of hardware and software, mainly including a central processing unit (CPU) of any computer, a memory, a program loaded into the memory, a storage unit (capable of storing not only a program stored in advance at the stage of shipping the apparatus, but also a program downloaded from, for example, a storage medium such as a compact disc (CD) or a server on the Internet) such as a hard disk that stores the program, and an interface for network connection. It will be understood to those skilled in the art that various modifications can be made to the method for implementing these functional units, and the apparatus.

FIG. 1 is a block diagram illustrating the hardware configuration of the processing apparatus according to this example embodiment. The processing apparatus includes a processor 1A, a memory 2A, an input/output interface 3A, a peripheral circuit 4A, and a bus 5A, as illustrated in FIG. 1. The peripheral circuit 4A includes various modules. The processing apparatus may include no peripheral circuit 4A. Note that the processing apparatus may be formed by a plurality of apparatuses physically and/or logically separated from each other. In this case, each of the plurality of apparatuses can be equipped with the above-mentioned hardware configuration.

The bus 5A serves as a data transmission line for allowing the processor 1A, the memory 2A, the peripheral circuit 4A, and the input/output interface 3A to exchange data with each other. The processor 1A is implemented as an arithmetic processing apparatus such as a CPU or a graphics processing unit (GPU). The memory 2A is implemented as a memory such as a random access memory (RAM) or a read only memory (ROM). The input/output interface 3A includes, for example, an interface for acquiring information from an input apparatus, an external apparatus, an external server, an external sensor, a camera, and the like, and an interface for outputting information to an output apparatus, an external apparatus, an external server, and the like. Examples of the input apparatus include a keyboard, a mouse, a microphone, a physical button, and a touch panel. Examples of the output apparatus include a display, a loudspeaker, a printer, and a mailer. The processor 1A can issue commands to the respective modules and perform arithmetic operation based on the arithmetic results of these commands.

Figure 2:
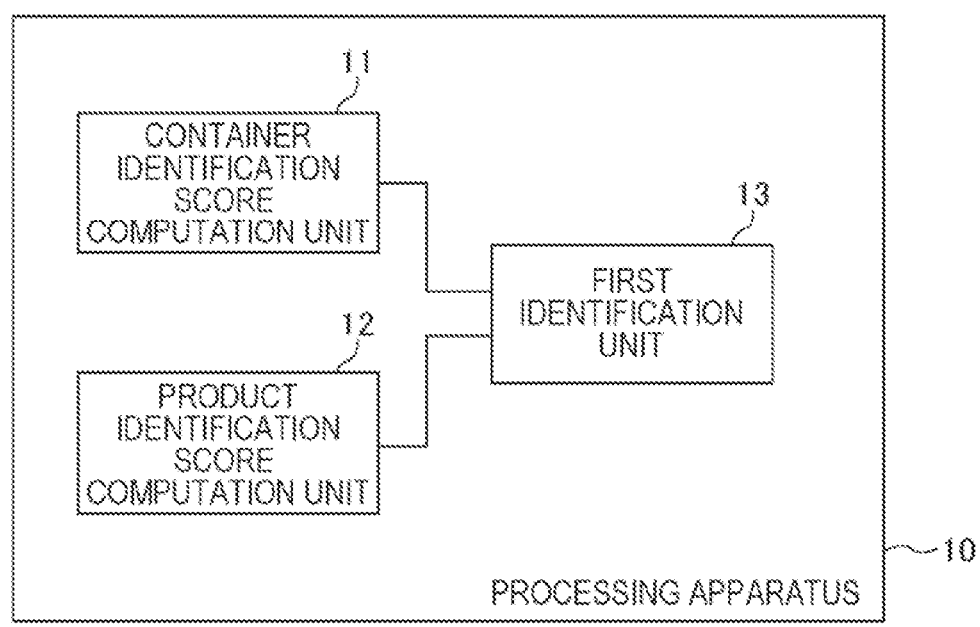
FIG. 2 is an exemplary functional block diagram of the processing apparatus according to this example embodiment.

An exemplary functional configuration of the processing apparatus will be described below. As depicted in a functional block diagram of FIG. 2, a processing apparatus 10 includes a container identification score computation unit 11, a product identification score computation unit 12, and a first identification unit 13.

The container identification score computation unit 11 computes an identification score of a container for a product, based on an image to be processed containing the product. The container identification score computation unit 11, for example, computes an identification score of a first container, based on an image to be processed containing a first product having a first object contained in the first container. Examples of the identification score of the first container include a "value representing the degree of similarity between the first container and each of a plurality of containers registered in advance," a "value representing the certainty factor that the first container is identical to each of a plurality of containers registered in advance," and a "value representing the confidence coefficient that the first container is identical to each of a plurality of containers registered in advance."

The container identification score computation unit 11 generates a computation result associating candidates for identification information of the first container and identification scores of the respective candidates with each other. The container identification score computation unit 11 may use, as the above-mentioned candidates, identification information of the container having an identification score equal to or higher than a threshold.

The container identification score computation unit 11 can, for example, implement the above-mentioned identification score computation using a first estimation model generated by machine learning. More specifically, an operator generates a large number of first training data associating an appearance image of each of a plurality of containers and identification information of this container with each other. Note that the appearance image of the container used as the first training data may include, for example, an image capturing only a container, and an image capturing a container containing an object. A computer performs machine learning based on the first training data, and generates a first estimation model for estimating identification information of the container from the image. Note that any scheme of machine learning can be employed (the same or similar description applies hereinafter).

The container identification score computation unit 11 computes candidates for identification information of the first container contained in the image to be processed, and identification scores of the respective candidates, based on the thus generated first estimation model and the image to be processed.

The container identification score computation unit 11 may even implement the above-mentioned identification score computation by processing of detecting a feature of the appearance of the container from the image to be processed, using, for example, a template matching technique. In this case, information associating identification information of each of a plurality of containers and the feature value (for example, the color, the shape, the size, or the pattern) of the appearance of this container with each other is stored in the processing apparatus in advance. Then, the container identification score computation unit 11 can compute a degree of similarity (a degree of similarity to a template) such as a sum of squared difference (SSD), a sum of absolute difference (SAD), or a normalized cross-correlation (NCC) as the identification score.

The product identification score computation unit 12 computes an identification score of the product, based on the above-mentioned image to be processed. The product identification score computation unit 12, for example, computes an identification score of a first product, based on an image to be processed containing the first product having a first object contained in a first container. Examples of the identification score of the first product include a "value representing the degree of similarity between the first product and each of a plurality of products registered in advance," a "value representing the certainty factor that the first product is identical to each of a plurality of products registered in advance," and a "value representing the confidence coefficient that the first product is identical to each of a plurality of products registered in advance."

The product identification score computation unit 12 generates a computation result associating candidates for identification information of the first product and identification scores of the respective candidates with each other. The product identification score computation unit may use, as the above-mentioned candidates, identification information of the product having an identification score equal to or higher than a threshold.

The product identification score computation unit 12 can, for example, implement the above-mentioned identification score computation using a second estimation model generated by machine learning. More specifically, an operator generates a large number of second training data associating an appearance image of each of a plurality of products and identification information of this product with each other. Note that the appearance image of the product used as the second training data may include, for example, an image capturing only an object, and an image capturing an object contained in a container. A computer performs machine learning based on the second training data, and generates a second estimation model for estimating identification information of the product from the image.

The product identification score computation unit 12 computes candidates for identification information of the first product contained in the image to be processed, and identification scores of the respective candidates, based on the thus generated second estimation model and the image to be processed.

The product identification score computation unit 12 may even implement the above-mentioned identification score computation by processing of detecting a feature of the appearance of the product from the image to be processed, using, for example, a template matching technique. In this case, information associating identification information of each of a plurality of products and the feature value (for example, the color, the shape, the size, or the pattern) of the appearance of this product with each other is stored in the processing apparatus 10 in advance. Then, the product identification score computation unit 12 can compute a degree of similarity (a degree of similarity to a template) such as an SSD, an SAD, or an NCC as the identification score.

The first identification unit 13 decides identification information of the first product, based on the identification score of the first container computed by the container identification score computation unit 11, the identification score of the first product computed by the product identification score computation unit 12, and container information.

The container information is stored in a storage apparatus included in the processing apparatus 10. FIG. 3 schematically illustrates exemplary container information. The container information refers to information associating identification information of products and identification information of containers for the respective products with each other, as illustrated in FIG. 3. One container can be used in common among a plurality of products, as described above. This makes it possible to reduce the number of types of containers used, thus facilitating, for example, preparation and management of the containers.

Processing of deciding, by the first identification unit 13, identification information of the first product, based on the identification score of the first container, the identification score of the first product, and the container information will be described in detail below.

The first identification unit 13 decides, as the identification information of the first product, an identification of a product which is included in the candidates for the identification information of the first product having an identification score equal to or higher than a first reference value, and being associated with the candidate for identification information of the first container having an identification score equal to or higher than a second reference value. A specific example of this processing will be given below with reference to FIG. 4.

Figure 4:
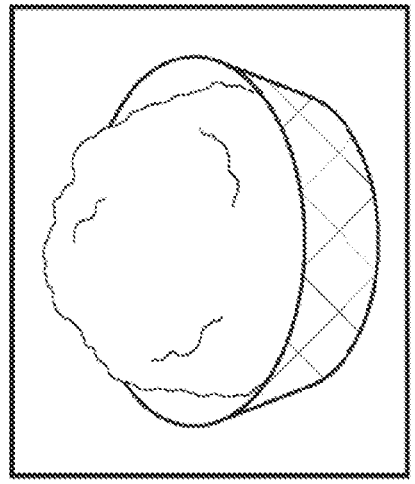
FIG. 4 is a diagram for explaining processing by the processing apparatus according to this example embodiment.
Figure 4:
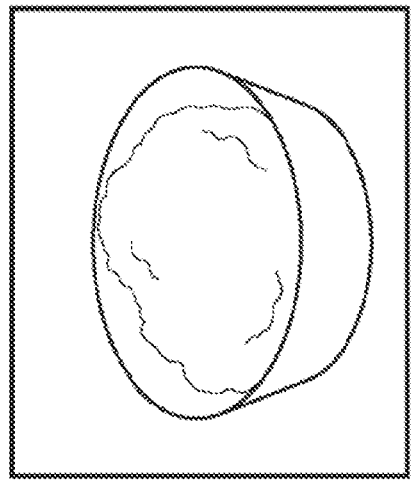

Assume that the products involved include a "medium serving of rice" and a "large serving of rice," as depicted in FIG. 4. These two products are similar in appearance to each other, and therefore have objects contained in containers different from each other. The "estimation result of the container" illustrated in FIG. 4 represents the identification score of the container generated by the container identification score computation unit 11, the "estimation result of the product" illustrated in FIG. 4 represents the identification score of the product generated by the product identification score computation unit 12, and the "identification result" represents the identification details decided by the first identification unit 13. The above-mentioned first reference value is set to, for example, "85%," and the above-mentioned second reference value is set to, for example, "90%."

The case where the image to be processed contains a "medium serving of rice" will be exemplified hereinafter. Referring to the identification score of the product (the estimation result of the product) generated by the product identification score computation unit 12, the candidates for the identification information of the first product having an identification score equal to or higher than the first reference value (85%) include, for example, a "medium serving of rice" and a "large serving of rice."

Referring to the identification score of the container (the estimation result of the container) generated by the container identification score computation unit 11, "container A" is determined as the candidate for the identification information of the first container having an identification score equal to or higher than the second reference value (90%).

The first identification unit 13 decides, as the identification information of the first product, the "medium serving of rice" which is included in the candidates (for example, a "medium serving of rice" and a "large serving of rice") for the identification information of the first product having an identification score equal to or higher than a first reference value (85%), and being associated, in the container information (see FIG. 3), with the candidate ("container A") for identification information of the first container having an identification score equal to or higher than a second reference value (90%).

Figure 5:
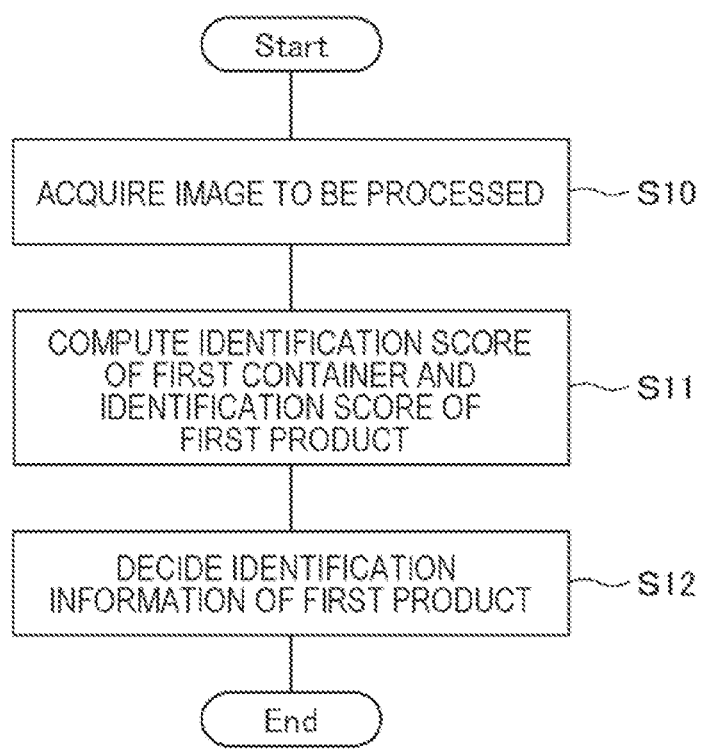
FIG. 5 is a flowchart illustrating an exemplary sequence of the processing by the processing apparatus according to this example embodiment.

An exemplary sequence of processing by the processing apparatus 10 will be described below with reference to a flowchart of FIG. 5.

The processing apparatus 10 first acquires an image to be processed containing a first product having a first object contained in a first container (S10). Note that in this specification, "acquisition" includes at least one of "retrieving, by the apparatus involved, data stored in other apparatuses or a storage medium (active acquisition)," based on user input or based on a program instruction, such as receiving data by requesting or inquiring them of other apparatuses, or accessing other apparatuses or a storage medium and reading data, and "inputting, to the apparatus involved, data output from other apparatuses (passive acquisition)," based on user input or based on a program instruction, such as receiving data delivered (or, for example, transmitted or sent by push notification), or acquiring data by selecting them from received data or information; and "acquiring new data by generating the new data by, for example, editing data (for example, conversion into text format, data sorting, extraction of partial data, and a change in file format)."

The processing apparatus 10 then performs processing of computing an identification score of the first container, based on the image to be processed, and processing of computing an identification score of the first product, based on the image to be processed (S11). The processing apparatus 10 generates a computation result associating candidates for identification information of the first container and identification scores of the respective candidates with each other, in the processing of computing an identification score of the first container. The processing apparatus 10 further generates a computation result associating candidates for identification information of the first product and identification scores of the respective candidates with each other, in the processing of computing an identification score of the first product. Specific examples of these types of processing have been given as above, and a description thereof will not be given herein. Note that the order of execution of these two types of processing is not particularly limited.

The processing apparatus 10 decides identification information of the first product, based on the "computation result associating candidates for identification information of the first container and identification scores of the respective candidates with each other" and the "computation result associating candidates for identification information of the first product and identification scores of the respective candidates with each other" generated in step S11, and "container information (see FIG. 3) associating identification information of products and identification information of containers for the respective products with each other" held in advance (S12).

More specifically, the processing apparatus 10 decides, as the identification information of the first product, an identification of a product which is included in the candidates for the identification information of the first product having an identification score equal to or higher than a first reference value, and being associated, in the container information, with the candidates for identification information of the first container having an identification score equal to or higher than a second reference value.

The advantageous effects of the processing apparatus 10 according to this example embodiment will be described below. In this example embodiment, when a plurality of products (for example, a "medium serving of rice" and a "large serving of rice") similar in appearance to each other are present, different containers are used for the respective products. The processing apparatus 10 performs not only processing of estimating identification information of the product by an image analysis, but also processing of estimating identification information of the container by the image analysis, and decides identification information of the product contained in the image to be processed, based on the two estimation results.

By the processing of estimating identification information of the product by the image analysis, a "group of products including a product contained in the image to be processed and a product similar in appearance to the former product" and a "group of other products" can be identified from each other. By the processing of estimating identification information of the container by the image analysis, a "product contained in the image to be processed" and a "product similar in appearance to the former product" can further be identified from each other. Therefore, the use of the above-mentioned two estimation results allows identification between a "product contained in the image to be processed" and "other products."

Note, as described above, that since identification between a "product contained in the image to be processed" and a "product dissimilar in appearance to the former product" is implemented by the processing of estimating identification information of the product by the image analysis, it need only be possible to identify at least a "product contained in the image to be processed" and a "product similar in appearance to the former product" from each other in the processing of estimating identification information of the container by the image analysis. In other words, it need not always be possible to identify a "product contained in the image to be processed" and a "product dissimilar in appearance to the former product" from each other in the processing of estimating identification information of the container by the image analysis. Therefore, one container can be used in common among a plurality of products dissimilar in appearance to each other, as described above. This makes it possible to reduce the number of types of containers used, thus facilitating, for example, preparation and management of the containers.

Second Example Embodiment

A processing apparatus 10 according to this example embodiment is different from that according to the first example embodiment in terms of the details of processing by a first identification unit 13 that decides identification information of a first product contained in an image to be processed, based on a computation result generated by a container identification score computation unit 11 and a computation result generated by a product identification score computation unit 12. Other configurations of the processing apparatus 10 according to this example embodiment are similar to those in the first example embodiment. Differences will be described below. Note that a premise of this example embodiment is similar to that of the first example embodiment.

The first identification unit 13 decides candidates for the identification information of the first product, based on the computation result (the identification score of the container) generated by the container identification score computation unit 11 and the container information (see FIG. 3). More specifically, the first identification unit 13 decides, as the candidates for the identification information of the first product, identification information of a product associated in the container information with candidates for identification information of the first container having an identification score equal to or higher than a second reference value. A specific example of this processing will be given below with reference to FIG. 4. Note that the second reference value is set to, for example, "90%."

The case where the image to be processed contains a "large serving of rice" will be exemplified hereinafter. Referring to the computation result (the estimation result of the container) generated by the container identification score computation unit 11, "container B" is determined as the candidates for the identification information of the first container having an identification score equal to or higher than the second reference value (90%). In view of this, the first identification unit 13 decides, as candidates for the identification information of the first product, identification information (for example, a "large serving of rice" and a "consommé soup") of products associated in the container information (see FIG. 3) with the candidate ("container B") for the identification information of the first container having an identification score equal to or higher than the second reference value (90%).

After deciding candidates for the identification information of the first product in the aforementioned way, the first identification unit 13 causes the product identification score computation unit 12 to perform processing of computing an identification score of the first product, using the decided candidates for the identification information of the first product as a target to be collated.

Like the first example embodiment, the product identification score computation unit 12 can, for example, implement the above-mentioned identification score computation using a second estimation model generated by machine learning. More specifically, an operator generates a large number of second training data associating an appearance image of each of a plurality of products and identification information of this product with each other. Note that the appearance image of the product used as the second training data may include, for example, an image capturing only an object, and an image capturing a container containing an object. A computer performs machine learning based on the second training data, and generates a second estimation model for estimating identification information of the product from the image.

Note that the computer can perform machine learning based on the above-mentioned training data for each group of products contained in identical containers, and generate the above-mentioned second estimation model for each group of products contained in identical containers. The product identification score computation unit 12 can perform the above-mentioned identification score computation, based on the image to be processed, and the above-mentioned second estimation model being associated with candidates for identification information of the first container having an identification score equal to or higher than the second reference value.

The product identification score computation unit 12 may even implement the above-mentioned identification score computation by processing of detecting a feature of the appearance of the product from the image to be processed, using, for example, a template matching technique, like the first example embodiment. In this case, the product identification score computation unit 12 can perform the above-mentioned identification score computation by, for example, a template matching technique that uses only a template for the candidates for the identification information of the first product decided by the first identification unit 13.

Figure 6:
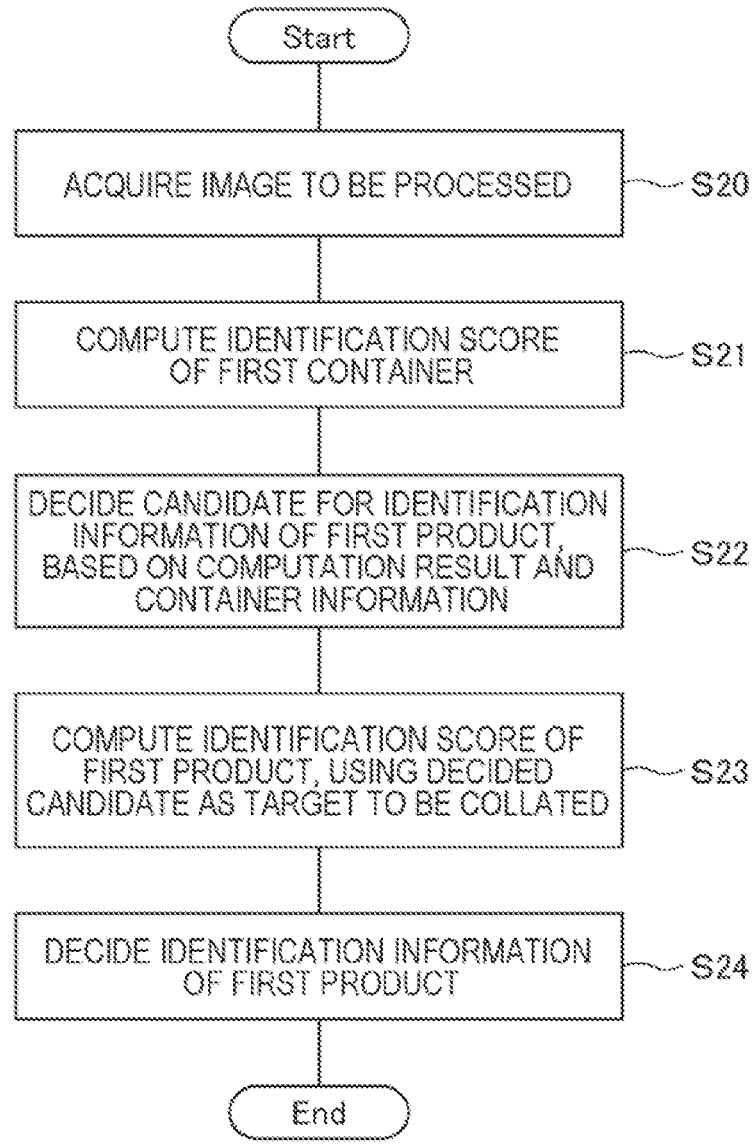
FIG. 6 is a flowchart illustrating another exemplary sequence of the processing by the processing apparatus according to this example embodiment.

An exemplary sequence of processing by the processing apparatus 10 will be described below with reference to a flowchart of FIG. 6.

The processing apparatus 10 first acquires an image to be processed containing a first product having a first object contained in a first container (S20).

The processing apparatus 10 then computes an identification score of the first container, based on the image to be processed (S21). A specific example of this processing has been given in the first example embodiment, and a description thereof will not be given herein.

The processing apparatus 10 decides candidates for identification information of the first product, based on the identification score computed in step S21, and container information (see FIG. 3) held in advance (S22). More specifically, the processing apparatus 10 decides, as the candidates for the identification information of the first product, identification information of a product associated in the container information with candidates for identification information of the first container having an identification score equal to or higher than a second reference value. A specific example of this processing has been given as above, and a description thereof will not be given herein.

The processing apparatus 10 performs processing of computing an identification score of the first product, using the candidates for the identification information of the first product decided in step S22 as a target to be collated (S23). A specific example of this processing has been given as above, and a description thereof will not be given herein.

The processing apparatus 10 decides identification information of the first product contained in the image to be processed, based on the computation result generated in step S23 (S24). The processing apparatus 10, for example, decides, as the identification information of the first product contained in the image to be processed, candidates for identification information of the first product having an identification score equal to or higher than a first reference value.

The processing apparatus 10 according to this example embodiment as described above achieves advantageous effects similar to those in the first example embodiment. In addition, since processing of estimating identification information of the product is performed after products to be collated are narrowed down based on the estimation result of the container, the estimation accuracy is expected to improve.

Third Example Embodiment

A processing apparatus 10 according to this example embodiment has the function of computing a degree of similarity in appearance between a plurality of products, based on an image, and suggesting a container for each product, based on the computation result (for example, suggesting that different containers should be used for products similar in appearance to each other). Note that a premise of this example embodiment is similar to those of the first and second example embodiments. Details will be described below.

An exemplary hardware configuration of the processing apparatus 10 according to this example embodiment is similar to those in the first and second example embodiments.

Figure 7:
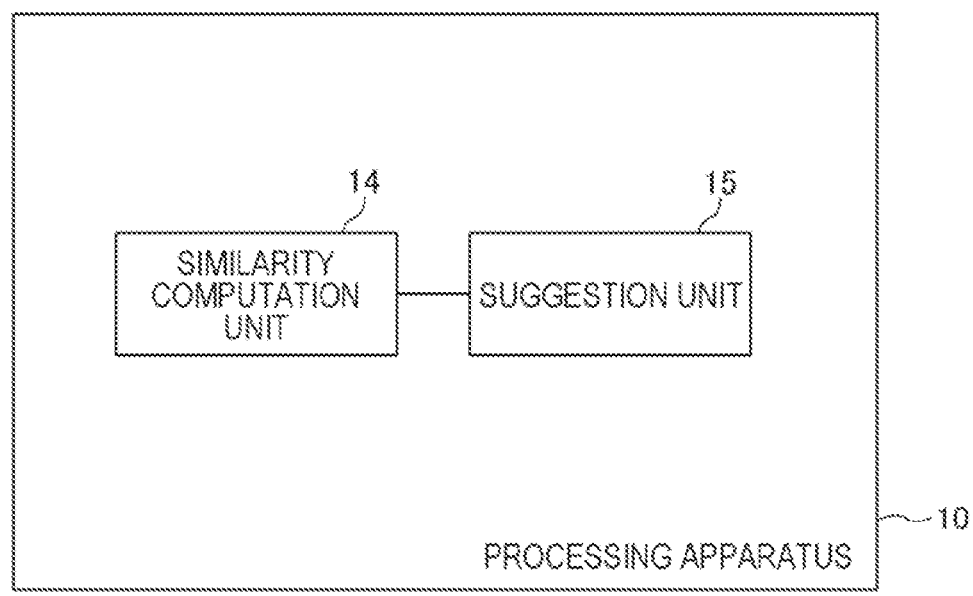
FIG. 7 is another exemplary functional block diagram of the processing apparatus according to this example embodiment.

FIG. 7 illustrates an exemplary functional block diagram of the processing apparatus 10 according to this example embodiment. The processing apparatus 10 includes a similarity computation unit 14 and a suggestion unit 15, as illustrated in FIG. 7. Note that the processing apparatus 10 may further include a container identification score computation unit 11, a product identification score computation unit 12, and a first identification unit 13. The configurations of the container identification score computation unit 11, the product identification score computation unit 12, and the first identification unit 13 are similar to those in the first or second example embodiment, and a description thereof will not be given herein.

The similarity computation unit 14 computes a degree of similarity between a container image being associated with identification information of a product and a container image that does not associate with the identification information of the product, based on the container image being associated with the identification information of the product, and the container image that does not associate with the identification information of the product.

The "container image being associated with the identification information of the product" refers to an image of a registered product (second product) having identification information registered in container information (see FIG. 3). The "container image that does not associate with the identification information of the product" refers to an image of a target product (third product) having identification information that is not registered in the container information.

In this example embodiment, an image of each registered product is stored in a storage apparatus included in the processing apparatus 10. The similarity computation unit 14, upon acquiring an image of a target product, computes a degree of similarity in appearance between each registered product and the target product, based on the image of this registered product and the image of the target product. A means for computing the degree of similarity is not particularly limited, and can employ any technique.

The suggestion unit 15 suggests a container for the target product, based on the degree of similarity computed by the similarity computation unit 14, and the container information (see FIG. 3). More specifically, the suggestion unit 15 suggests, as the container for the target product, a container different from that for a registered product having a degree of similarity to the target product equal to or higher than a fourth reference value.

Figure 8:
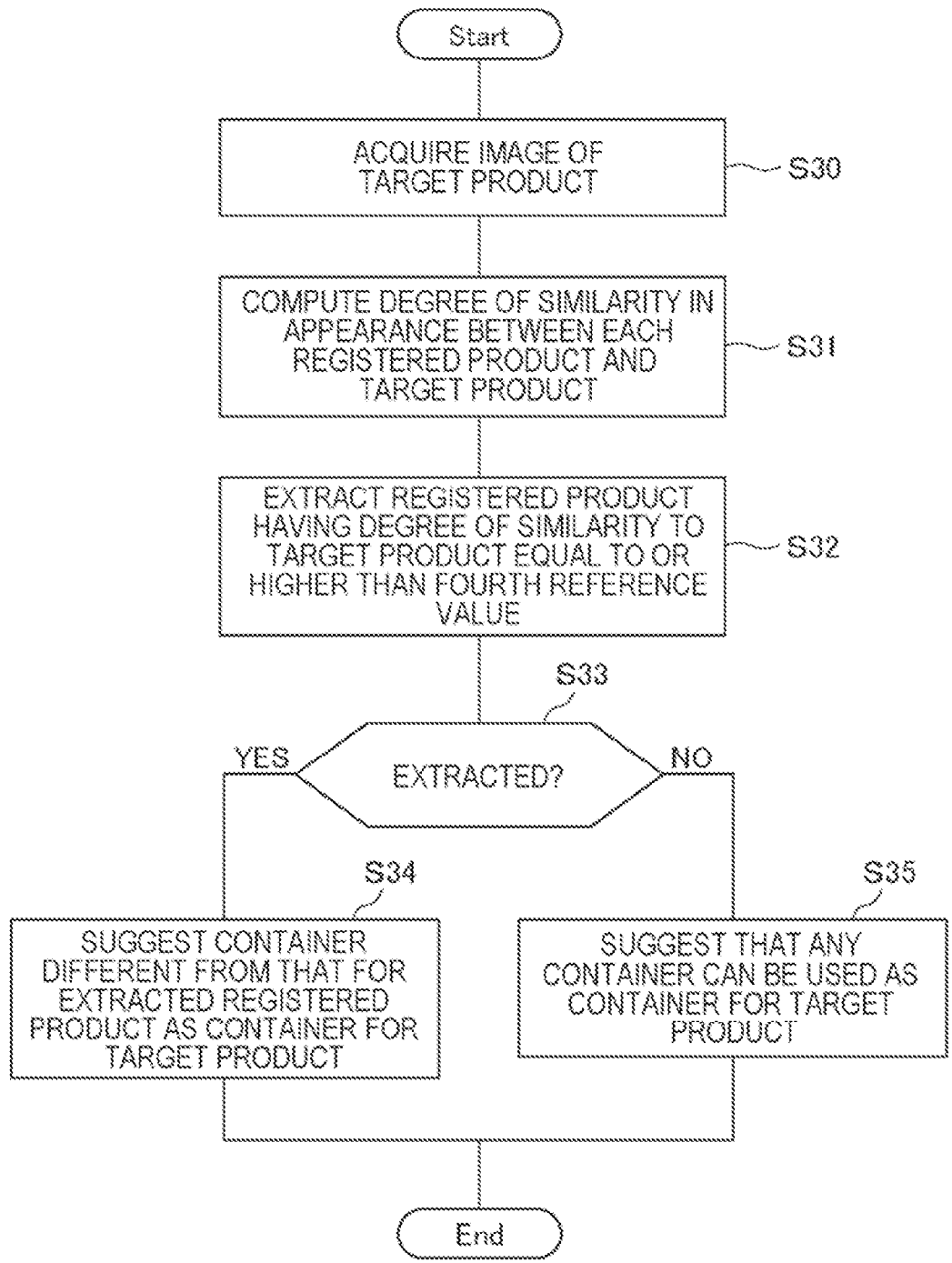
FIG. 8 is a flowchart illustrating an exemplary sequence of processing by the processing apparatus according to this example embodiment.

An exemplary sequence of processing by the processing apparatus 10 will be described below with reference to a flowchart of FIG. 8.

The processing apparatus 10 first acquires an image containing a target product (S30). The processing apparatus 10 then computes a degree of similarity in appearance between each registered product and the target product, based on an image of this registered product having identification information registered in container information (see FIG. 3), and the image of the target product (S31).

The processing apparatus 10 extracts a registered product having a degree of similarity to the target product equal to or higher than a fourth reference value (S32).

When at least one registered product is extracted in step S32 (Yes in step S33), the processing apparatus 10 suggests a container different from that for the extracted registered product as a container for the target product by referring to the container information (see FIG. 3) (S34).

On the other hand, when no registered product is extracted in step S32 (No in step S33), the processing apparatus 10, for example, suggests that any container can be used as a container for the target product (S35).

The processing apparatus 10 according to this example embodiment as described above can suggest a container for each product in such a way that a group of products similar in appearance to each other can be accurately identified by image analysis. As a result, with the techniques described in the first and second example embodiments, a group of products similar in appearance to each other can be accurately identified by the image analysis.

When the processing apparatus 10 according to this example embodiment has a configuration similar to that of the processing apparatus 10 according to each of the first and second example embodiments, it can achieve advantageous effects similar to those of the processing apparatus 10 according to the corresponding one of the first and second example embodiments.

Fourth Example Embodiment

In this example embodiment, the premise described in the first example embodiment may subsist or may not subsist.

An overview of a processing apparatus 10 according to this example embodiment will be described below. The processing apparatus 10 determines an appearance feature including at least one of the shape, the color, and the size of a fourth product, based on an image to be processed containing the fourth product. The processing apparatus 10 estimates identification information of the fourth product, based on the above-mentioned image to be processed. The processing apparatus 10 decides identification information of the fourth product, based on the determination result of the appearance feature, the estimation result of the identification information of the fourth product, and product feature information associating identification information of products and appearance features of the respective products with each other.

An exemplary hardware configuration of the processing apparatus 10 according to this example embodiment is similar to those in the first to third example embodiments.

Figure 9:
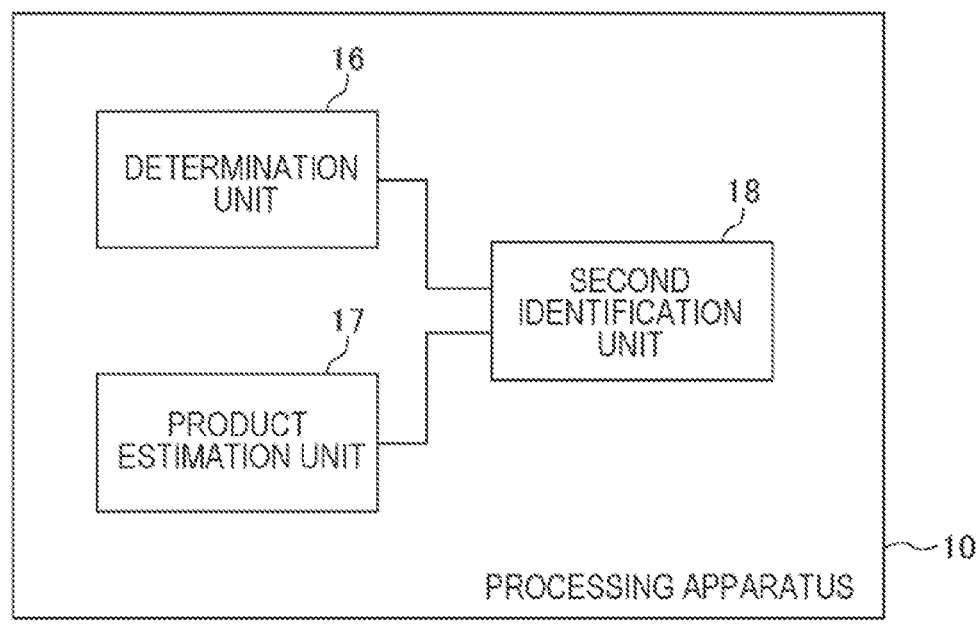
FIG. 9 is still another exemplary functional block diagram of the processing apparatus according to this example embodiment.

FIG. 9 illustrates an exemplary functional block diagram of the processing apparatus 10 according to this example embodiment. The processing apparatus 10 includes a determination unit 16, a product estimation unit 17, and a second identification unit 18, as illustrated in FIG. 9. Note that the processing apparatus 10 may further include a container identification score computation unit 11, a product identification score computation unit 12, and a first identification unit 13. The processing apparatus 10 may further include a similarity computation unit 14 and a suggestion unit 15. The configurations of the container identification score computation unit 11, the product identification score computation unit 12, the first identification unit 13, the similarity computation unit 14, and the suggestion unit 15 are similar to those in the first to third example embodiments, and a description thereof will not be given herein.

The determination unit 16 determines an appearance feature including at least one of the shape, the color, and the size of a fourth product, based on an image to be processed containing the fourth product. A means for determining such an appearance feature is merely a design matter, and can employ any technique. Note that the shape to be determined may be implemented as the planar shape (two-dimensional shape) of the product appearing in the image, as the planar shape (two-dimensional shape) of a predetermined surface of the product appearing in the image, or as other shapes.

The product estimation unit 17 estimates identification information of the fourth product, based on the image to be processed. The product estimation unit 17 generates a computation result associating candidates for identification information of the fourth product and identification scores of the respective candidates with each other. The product estimation unit implements the above-mentioned computation by processing similar to that of computing, by the product identification score computation unit 12, an identification score of the first product, based on the image to be processed.

The second identification unit 18 decides identification information of the fourth product, based on the determination result generated by the determination unit 16, the computation result generated by the product estimation unit 17, and product feature information.

The product feature information is stored in a storage apparatus included in the processing apparatus 10. FIG. 10 schematically illustrates exemplary product feature information. The product feature information refers to information associating identification information of products and appearance features of the respective products with each other, as illustrated in FIG. 10. In the example illustrated in FIG. 10, a shape is taken as an example of the appearance feature, but a color, a size, or the like is also applicable as the appearance feature.

Processing of deciding, by the second identification unit 18, identification information of the fourth product, based on the determination result generated by the determination unit 16, the estimation result generated by the product estimation unit 17, and the above-mentioned product feature information will be described in detail below.

The second identification unit 18 decides, as the identification information of the fourth product, an identification of a product which is included in the candidates for the identification information of the fourth product having an identification score equal to or higher than a third reference value, and being associated in the product feature information with the appearance feature determined by the determination unit 16. A specific example of this processing will be given below with reference to FIG. 11.

Figure 11:
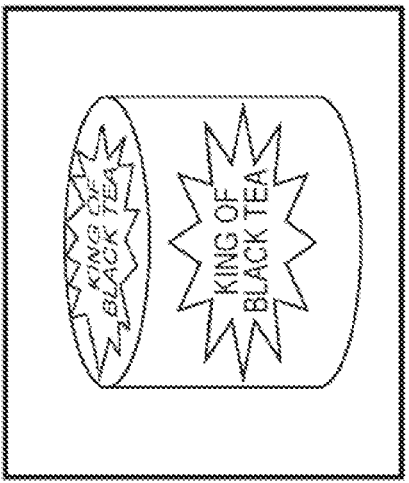
FIG. 11 is a diagram for explaining processing by the processing apparatus according to this example embodiment.
Figure 11:
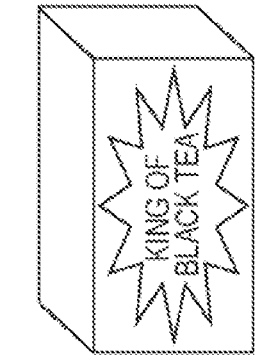

Assume that the products involved include "King of Black Tea (tea bag)" and "King of Black Tea (powder)," as depicted in FIG. 11. These two products are of the same brand and are, therefore, identical or similar in package design to each other. The "determination result of the shape" illustrated in FIG. 11 represents the determination result generated by the determination unit 16, the "estimation result of the product" illustrated in FIG. 11 represents the computation result generated by the product estimation unit 17, and the "identification result" illustrated in FIG. 11 represents the identification details decided by the second identification unit 18. The above-mentioned third reference value is set to, for example, "85%."

The case where the image to be processed contains "King of Black Tea (tea bag)" will be exemplified hereinafter. Referring to the computation result (the estimation result of the product) generated by the product estimation unit 17, the candidates for the identification information of the fourth product having an identification score equal to or higher than the third reference value (85%) include, for example, "King of Black Tea (tea bag)" and "King of Black Tea (powder)."

Referring to the determination result (the determination result of the shape) generated by the determination unit 16, a "quadrangle" is determined as the shape of the fourth product.

The second identification unit 18 decides, as the identification information of the fourth product, "King of Black Tea (tea bag)" which is included in the candidates (for example, "King of Black Tea (tea bag)" and "King of Black Tea (powder)") for the identification information of the fourth product having an identification score equal to or higher than a third reference value (85%), and being associated in the product feature information (see FIG. 10) with the "quadrangle" that is the appearance feature determined by the determination unit 16.

Figure 12:
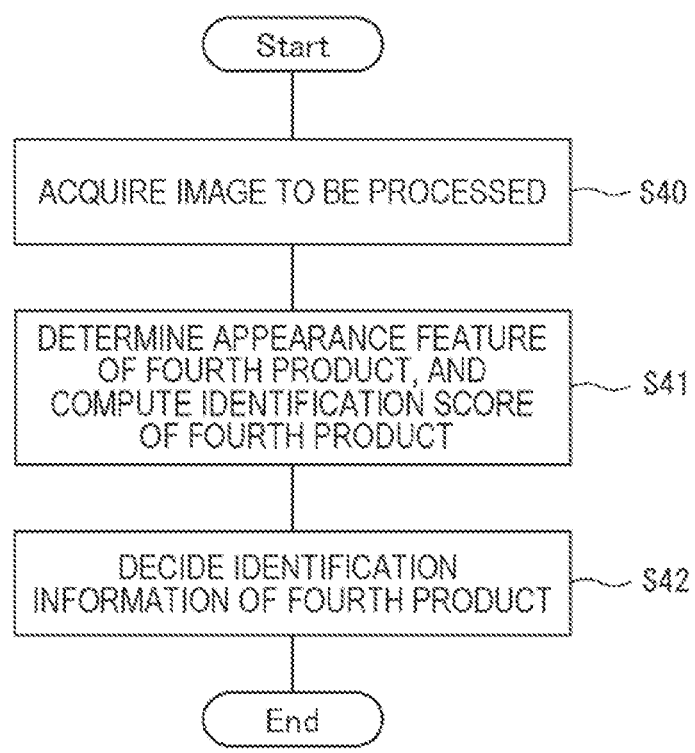
FIG. 12 is a flowchart illustrating an exemplary sequence of the processing by the processing apparatus according to this example embodiment.

An exemplary sequence of processing by the processing apparatus 10 will be described below with reference to a flowchart of FIG. 12.

The processing apparatus 10 first acquires an image to be processed containing a fourth product (S40).

The processing apparatus 10 then performs processing of determining an appearance feature (at least one of the shape, the color, and the size) of the fourth product, based on the image to be processed, and processing of computing an identification score of the fourth product, based on the image to be processed (S41). The processing apparatus 10 generates a computation result associating candidates for identification information of the fourth product and identification scores of the respective candidates with each other, in the processing of computing an identification score of the fourth product. Note that the order of execution of these two types of processing is not particularly limited.

The processing apparatus 10 decides identification information of the fourth product, based on the "determination result of the appearance feature of the fourth product" and the "computation result associating candidates for identification information of the fourth product and identification scores of the respective candidates with each other" generated in step S41, and "product feature information (see FIG. 10) associating identification information of products and appearance features of the respective products with each other" held in advance (S42).

More specifically, the processing apparatus 10 decides, as the identification information of the fourth product, an identification of a product which is included in the candidates for the identification information of the fourth product having an identification score equal to or higher than a third reference value, and being associated in the product feature information with the appearance feature determined by the determination unit 16.

The advantageous effects of the processing apparatus 10 according to this example embodiment will be described below. The processing apparatus 10 according to this example embodiment performs not only processing of estimating identification information of the product by image analysis, but also processing of determining an appearance feature (at least one of the shape, the color, and the size) of the product by the image analysis, and decides identification information of the product contained in the image to be processed, based on the two, estimation result and determination result.

By the processing of estimating identification information of the product by the image analysis, a "group of products including a product contained in the image to be processed and a product similar in appearance to the former product" and a "group of other products" can be identified from each other. By the processing of determining an appearance feature of the product by the image analysis, a "product contained in the image to be processed" and a "product similar in appearance to the former product" can often further be identified from each other. Therefore, the use of the two, estimation result and determination result facilitates identification between a "product contained in the image to be processed" and "other products." As a result, a group of products similar in appearance to each other can be accurately identified by the image analysis.

When the processing apparatus 10 according to this example embodiment has a configuration similar to that of the processing apparatus 10 according to each of the first to third example embodiments, it can achieve advantageous effects similar to those of the processing apparatus 10 according to the corresponding one of the first to third example embodiments.

Fifth Example Embodiment

A processing apparatus 10 according to this example embodiment is different from that according to the fourth example embodiment in terms of the details of processing by a second identification unit 18 that decides identification information of a fourth product contained in an image to be processed, based on a determination result generated by a determination unit 16 and a computation result generated by a product estimation unit 17. Other configurations of the processing apparatus 10 according to this example embodiment are similar to those in the fourth example embodiment. Differences will be described below. Note that a premise of this example embodiment is similar to that of the fourth example embodiment.

The second identification unit 18 decides candidates for the identification information of the fourth product, based on the determination result generated by the determination unit 16 and product feature information (see FIG. 10). More specifically, the second identification unit 18 decides, as the candidates for the identification information of the fourth product, identification information of a product associated in the product feature information with the appearance feature determined by the determination unit 16. A specific example of this processing will be given below with reference to FIG. 10.

The case where the image to be processed contains "King of Black Tea (powder)" will be exemplified hereinafter. Referring to the determination result (the determination result of the shape) generated by the determination unit 16, a "circle" is determined as the shape of the fourth product. In view of this, the second identification unit 18 decides, as candidates for the identification information of the fourth product, identification information (for example, "King of Black Tea (powder)" and "Pizzano") of products associated with the shape "circle" in the product feature information (see FIG. 10).

After deciding candidates for the identification information of the fourth product in the aforementioned way, the second identification unit 18 causes the product estimation unit 17 to perform processing of computing an identification score of the fourth product, using the decided candidates for the identification information of the fourth product as a target to be collated. The processing by the product estimation unit 17 is similar to the estimation processing by the product identification score computation unit 12 described in the second example embodiment.

Figure 13:
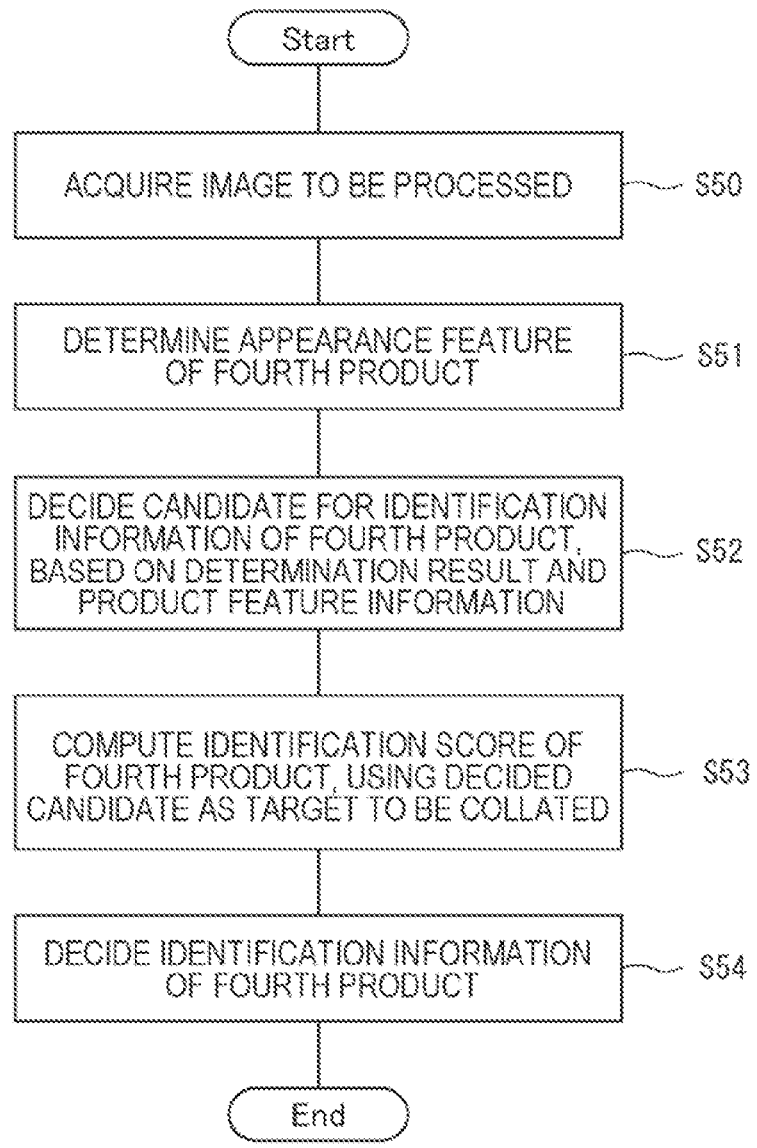
FIG. 13 is a flowchart illustrating another exemplary sequence of the processing by the processing apparatus according to this example embodiment.

An exemplary sequence of processing by the processing apparatus 10 will be described below with reference to a flowchart of FIG. 13.

The processing apparatus 10 first acquires an image to be processed containing a fourth product (S50).

The processing apparatus 10 then determines an appearance feature (at least one of the shape, the color, and the size) of the fourth product, based on the image to be processed (S51).

The processing apparatus 10 decides candidates for identification information of the fourth product, based on the determination result generated in step S51, and product feature information (see FIG. 10) held in advance (S52). More specifically, the processing apparatus 10 decides, as the candidates for the identification information of the fourth product, identification information of a product associated in the product feature information with the appearance feature determined by the determination unit 16. A specific example of this processing has been given as above, and a description thereof will not be given herein.

The processing apparatus 10 performs processing of computing an identification score of the fourth product, using the candidates for the identification information of the fourth product decided in step S52 as a target to be collated (S53). A specific example of this processing has been given as above, and a description thereof will not be given herein.

The processing apparatus 10 decides identification information of the fourth product contained in the image to be processed, based on the computation result generated in step S53 (S54). The processing apparatus 10, for example, decides, as the identification information of the fourth product contained in the image to be processed, candidates for identification information of the fourth product having an identification score equal to or higher than a third reference value.

The processing apparatus 10 according to this example embodiment as described above achieves advantageous effects similar to those in the fourth example embodiment. In addition, since processing of estimating identification information of the product is performed after products to be collated are narrowed down based on the determination result of the appearance feature of the product, the estimation accuracy is expected to improve.

Sixth Example Embodiment

Figure 14:
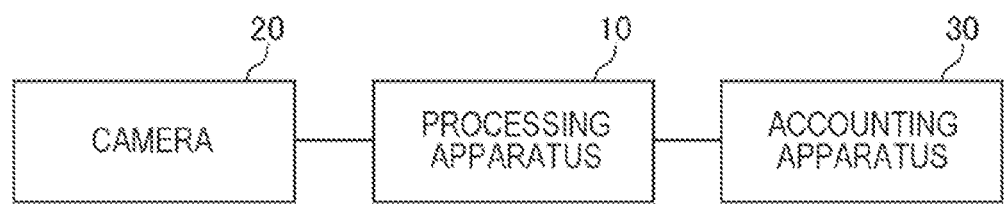
FIG. 14 is an exemplary functional block diagram of an accounting system according to this example embodiment.

A processing apparatus 10 according to this example embodiment is used by interlocking with a camera and an accounting apparatus placed in, for example, a store or a shop. FIG. 14 illustrates an exemplary functional block diagram of an accounting system according to this example embodiment. The accounting system includes the processing apparatus 10, a camera 20, and an accounting apparatus 30 (for example, a point of sales (POS) system), as illustrated in FIG. 14. The processing apparatus 10 and the camera 20 perform wired and/or wireless communication with each other. The processing apparatus 10 and the accounting apparatus 30 also perform wired and/or wireless communication with each other.

Figure 15:
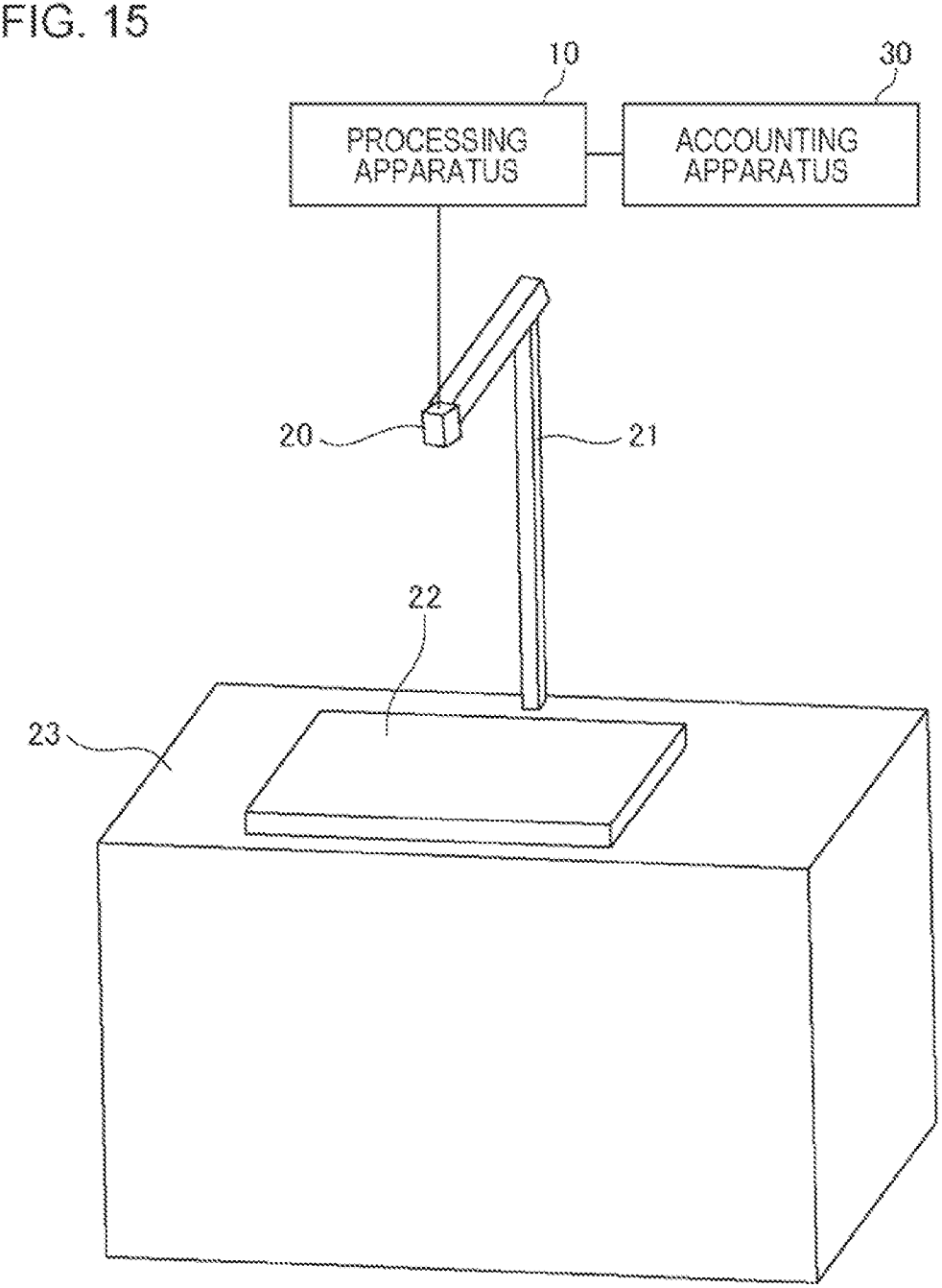
FIG. 15 is a diagram illustrating a placement example of a camera 20 for the accounting system according to this example embodiment.

FIG. 15 illustrates a placement example of the camera 20. In the example illustrated in FIG. 15, a mount area 22 to mount a product is formed on a table 23. A product to be accounted for is mounted in the mount area 22. The camera 20 is connected to a support column 21. The camera 20 is placed in a position and orientation to capture the mount area 22. In other words, the camera 20 is placed in a position and orientation to capture the product mounted in the mount area 22 from above. The camera 20 transmits generated image data to the processing apparatus 10. Note that a plurality of cameras 20 may be placed. In this case, at least one camera 20 may be placed on the table 23 and capture the product sideways.

The processing apparatus 10 acquires the image data generated by the camera 20. The processing apparatus 10 performs the processing described in any of the first to fifth example embodiments, based on the acquired image data, and decides identification information of the product (the first product or the fourth product) contained in the image. The processing apparatus 10 transmits the decided identification information of the product to the accounting apparatus 30.

Figure 16:
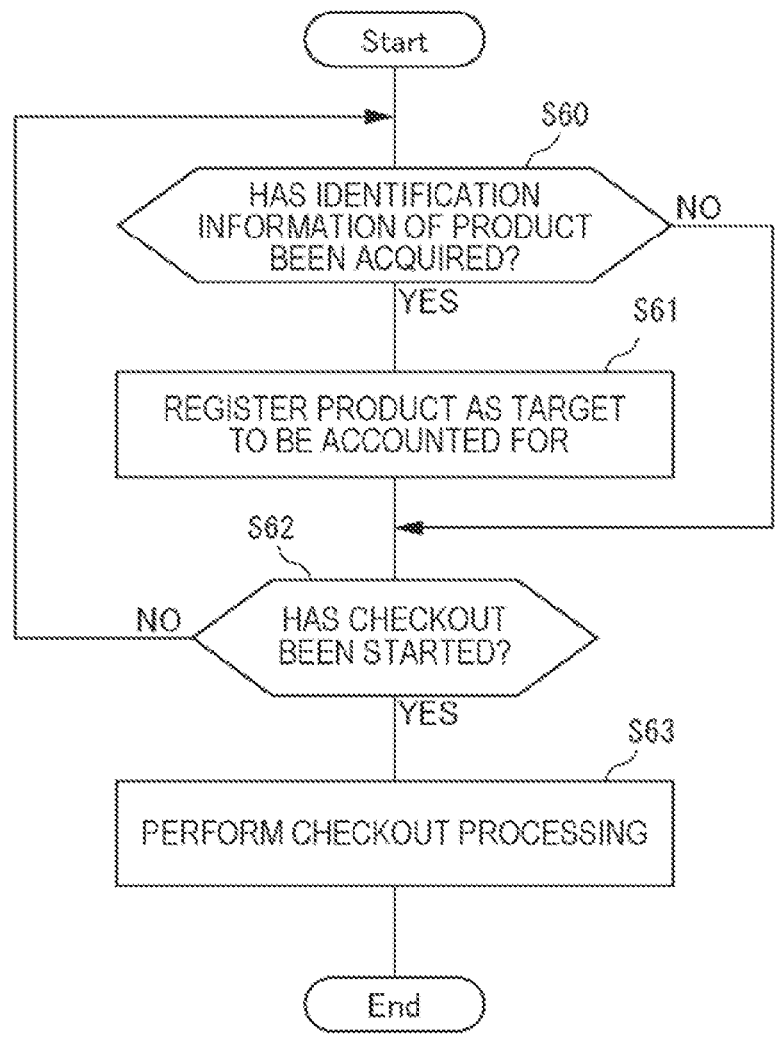
FIG. 16 is a flowchart illustrating an exemplary sequence of processing by an accounting apparatus according to this example embodiment.

The accounting apparatus 30 performs accounting processing, based on the information received from the processing apparatus 10. An exemplary sequence of processing by the accounting apparatus 30 will be described below with reference to a flowchart of FIG. 16.

The accounting apparatus 30 is in a wait state for identification information of a product (S60). When the accounting apparatus 30 acquires identification information of a product from the processing apparatus 10 (Yes in step S60), it registers the product as a target to be accounted for (S61). The accounting apparatus 30, for example, refers to a product master registered in a store system or the like in advance, acquires product information (for example, a unit price and a product name) associated with the acquired identification information of the product, and registers the acquired product information as a target to be accounted for.

Upon registering at least one product as a target to be accounted for, the accounting apparatus 30 enters an input wait state to start checkout processing (S62), and the wait state for identification information of a product (S60).

Upon accepting user input (input indicating that product registration is complete) to start checkout processing (Yes in step S62), the accounting apparatus 30 performs checkout processing (S63). The input in step S62 is implemented via any input apparatus such as a physical button, a touch panel, or a microphone. In the checkout processing, the accounting apparatus 30, for example, accepts user input to select a settlement method. Examples of the settlement method include cash, credit card settlement, electronic money settlement, and settlement using biometric (for example, face, iris, fingerprint, or vein) authentication, but the present invention is not limited to these examples. The accounting apparatus 30 carries out settlement by a settlement method selected by a customer. The accounting apparatus 30 may, for example, accept input of cash as payment of a total amount of payment computed based on the registered product, and output change, where necessary, and a receipt. The accounting apparatus 30 may also accept input of credit card information, communicate with a system in a credit card company, and perform settlement processing. The accounting apparatus 30 may even transmit information (for example, information indicating the registered product, and a total amount of payment) for checkout processing to other checkout apparatuses. The accounting apparatus 30 may even accept input of an amount of deposit deposited from a customer, compute an amount of change based on the input amount of deposit, display the amount of change on a display, and give back the computed change. The accounting apparatus 30 may even transmit an electronic receipt indicating accounting details to an external apparatus. The accounting apparatus 30 may, for example, transmit an electronic receipt to a customer terminal by near-field communication. The accounting apparatus 30 may further transmit information indicating accounting details to a store server. The store server may transmit an electronic receipt indicating accounting details to a predetermined server. When the checkout processing is completed, the accounting apparatus 30 enters the wait state for identification information of a product again (S60).

The accounting system according to this example embodiment as described above achieves advantageous effects similar to those in the first to fifth example embodiments. In addition, since the processing apparatus 10 can accurately identify a group of products similar in appearance to each other by image analysis, the manpower required for the processing of registering a product as a target to be accounted for can be reduced.

Although the present invention has been described above with reference to the example embodiments (and examples), the present invention is not limited to the above-described example embodiments (and examples). For example, a plurality of example embodiments (and examples) of the above-described example embodiments (and examples) can be practiced together in any combination. Various changes that can be understood by those skilled in the art can be made to the configurations and details of the present invention within the scope of the present invention.

Part or all of the above-described example embodiments may be described as in the following supplementary notes, but they are not limited thereto.

1. A processing apparatus including:
    a container identification score computation means for computing an identification score of a container for a product, based on an image to be processed containing the product;
    a product identification score computation means for computing an identification score of the product, based on the image to be processed; and
    a first identification means for deciding identification information of the product, based on the computed identification score of the container and the computed identification score of the product.

2. The processing apparatus according to supplementary note 1, wherein
    the first identification means decides, as the identification information of the product, an identification of a product which is included in candidates for the identification information of the first product having the identification score of the product equal to or higher than a first reference value, and being associated with candidates for identification information of the first container having the identification score of the container equal to or higher than a second reference value.

3. The processing apparatus according to supplementary note 1, wherein
    the first identification means decides candidates for the identification information of the product, based on the identification score of the container, and
    the product identification score computation means computes the identification score of each of the decided candidates for the identification information of the product.

4. The processing apparatus according to any one of supplementary notes 1 to 3, further including:
    a similarity computation means for computing a degree of similarity between a container image being associated with the identification information of the product and a container image that does not associate with the identification information of the product, based on the container image being associated with the identification information, and the container image that does not associate with the identification information; and
    a suggestion means for suggesting a container for a product that does not associate with the identification information of the product, based on the degree of similarity.

5. A processing method executed by a computer including:
    a container identification score computation step of computing an identification score of a container for a product, based on an image to be processed containing the product;
    a product identification score computation step of computing an identification score of the product, based on the image to be processed; and
    a first identification step of deciding identification information of the product, based on the computed identification score of the container and the computed identification score of the product.

6. A program for causing a computer to function as:
    a container identification score computation means for computing an identification score of a container for a product, based on an image to be processed containing the product;
    a product identification score computation means for computing an identification score of the product, based on the image to be processed; and
    a first identification means for deciding identification information of the product, based on the computed identification score of the container and the computed identification score of the product.

7. A processing apparatus including:
    a determination means for determining an appearance feature including at least one of a shape, a color, and a size of a product, based on an image to be processed containing the product;
    a product estimation means for estimating identification information of the product, based on the image to be processed; and
    a second identification means for deciding identification information of the product, based on the determined appearance feature and the estimated identification information of the product.

8. The processing apparatus according to supplementary note 7, wherein
    the second identification means decides the identification information of the product, based on the appearance feature determined by the determination means, from candidates for the identification information of the product having an identification score equal to or higher than a reference value.

9. The processing apparatus according to supplementary note 7, wherein
    the second identification means decides candidates for the identification information of the product, based on the appearance feature determined by the determination means, and causes the product estimation means to perform processing of estimating identification information of the product, using the decided candidates for the identification information of the product as a target to be collated.

10. A processing method executed by a computer including:
- a determination step of determining an appearance feature including at least one of a shape, a color, and a size of a product, based on an image to be processed containing the product;
- a product estimation step of estimating identification information of the product, based on the image to be processed; and
- a second identification step of deciding identification information of the product, based on the determined appearance feature and the estimated identification information of the product.

11. A program for causing a computer to function as:
- a determination means for determining an appearance feature including at least one of a shape, a color, and a size of a product, based on an image to be processed containing the product;
- a product estimation means for estimating identification information of the product, based on the image to be processed; and
- a second identification means for deciding identification information of the product, based on the determined appearance feature and the estimated identification information of the product.

What is claimed is:

1. A processing apparatus comprising:
- at least one memory configured to store one or more instructions; and
- at least one processor configured to execute the one or more instructions to:
- compute an identification score of a container of a product, based on an image of the product, the product including an object contained in the container;
- compute an identification score of the product, based on the image;
- determine identification information of the product, based on the computed identification score of the container and the computed identification score of the product;
- identify a plurality of other products similar in appearance to the product, based on the determined identification information of the product;
- compute a degree of similarity in appearance of each of the plurality of other products with the product; and
- suggest a container for each of the plurality of other products based on the degree of similarity in appearance with the product, such that a first product that is similar in appearance to a second product has a first container suggested therefor that is different than a second container suggested for the second product.

2. The processing apparatus according to claim 1, wherein the identification information of the product is determined by:
- identifying candidate products for which the identification score of the product is higher than a first reference value, and that are associated with candidate containers for which the identification score of the container is equal to or higher than a second reference value.

3. A processing method executed by a computer comprising:
- computing an identification score of a container of a product, based on an image of the product, the product including an object contained in the container;
- computing an identification score of the product, based on the image;
- determining identification information of the product, based on the computed identification score of the container and the computed identification score of the product;
- identifying a plurality of other products similar in appearance to the product, based on the determined identification information of the product;
- computing a degree of similarity in appearance of each of the plurality of other products with the product; and
- suggesting a container for each of the plurality of other products based on the degree of similarity in appearance with the product, such that a first product that is similar in appearance to a second product has a first container suggested therefor that is different than a second container suggested for the second product.

* * * * *